UNITED STATES PATENT OFFICE.

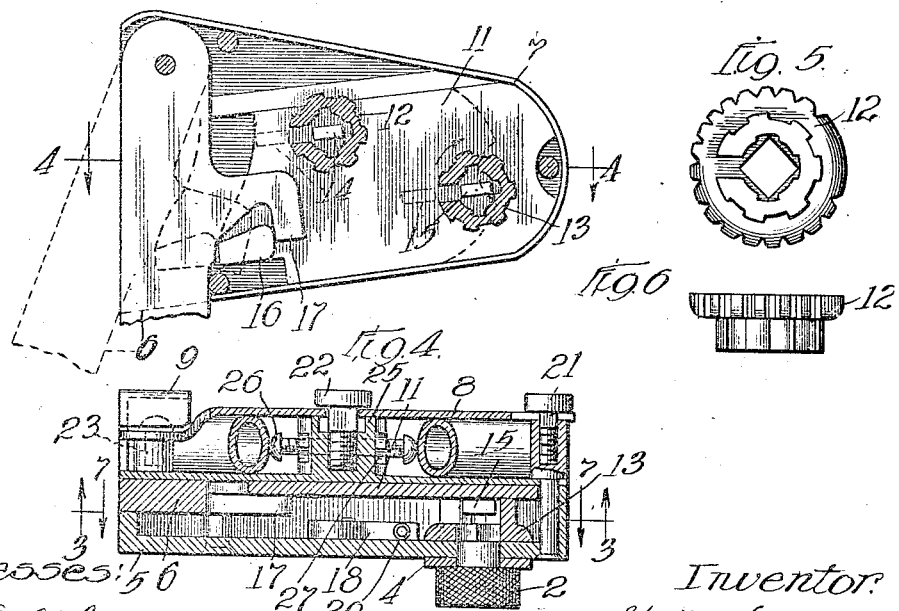

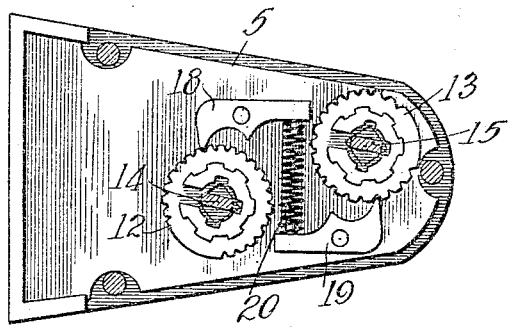
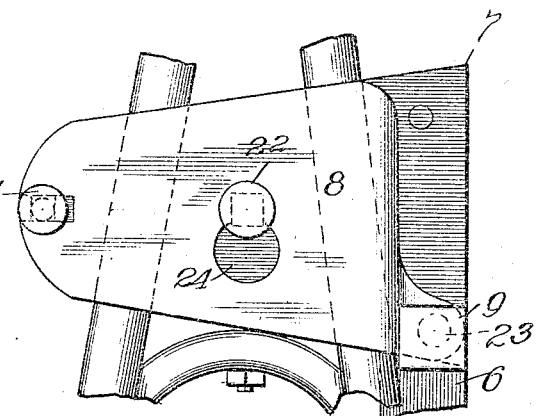
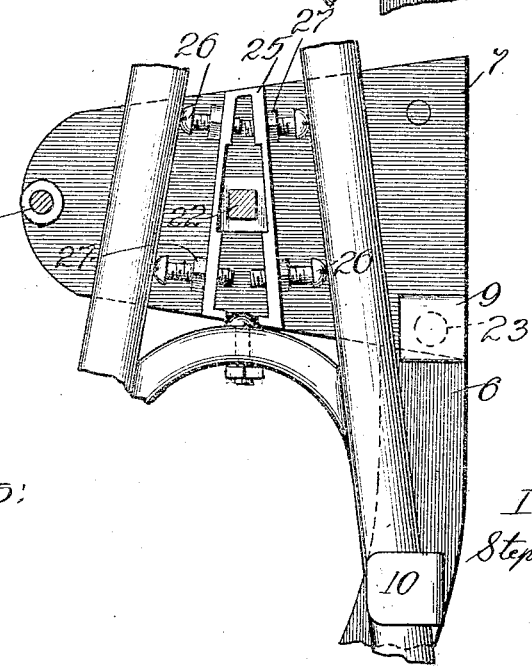

STEPHEN MOFFLER, OF CHICAGO, ILLINOIS.

COMBINATION BICYCLE-LOCK.

1,291,076.

Specification of Letters Patent. Patented Jan. 14, 1919.

Application filed November 24, 1917. Serial No. 203,828.

*To all whom it may concern:*

Be it known that I, STEPHEN MOFFLER, a citizen of Hungary, who has declared his intention of becoming a citizen of the United States, residing at Chicago, in the county of Cook, State of Illinois, have invented certain new and useful Improvements in Combination Bicycle-Locks; and I do hereby declare the following to be a full, clear, and exact description of the invention, such as will be readily understood by others who are skilled in the art to which it belongs, so that they can make and use the same.

The primary object of the invention is to provide a lock for the safe locking of bicycles and other vehicles when not in use, by means of a combination lock, so that it will not be possible to use such bicycle or other vehicle unless the lock is first unlocked by one who is familiar with the combination of the particular lock.

Another object of the invention is to provide a lock which can be attached to the bicycle in a manner, making the removal of the lock, by one who cannot open it by means of the combination, impossible by ordinary means.

With the above objects in mind, the invention consists, in the arrangement of the parts illustrated in the accompanying drawings in a manner which is described in detail hereafter. The description will disclose the preferred objects of the invention which will be hereafter pointed out in the claim.

In the drawings:—Figure 1 illustrates a front view of the lock, in a closed, or locked condition, and attached to a bicycle. Fig. 2 represents a side view of the lock in the same condition. Fig. 3 represents the inside of the lock with the front plate removed; it also shows within, a sliding locking plate. In Fig. 4 is a cross-sectional view taken lengthwise through the lock. Figs. 5 and 6 are face and side views of the combination cogwheels. In Fig. 7 is shown the cogwheel shown in Fig. 5 pivoted in its place. It further shows the cog-dogs, as pivoted to top plate and held in contact with combination notches upon the cogwheel, by means of a spring. Fig. 8 illustrates a face view of the covering plate, while in Fig. 9 is shown the means used to attach the lock to the bicycle before the covering plate is attached.

In the following specific description similar numbers will always be used to refer to the same part of the invention throughout the different figures.

In referring to the drawings by numerals, 7 in Fig. 3 designates the shell of the lock consisting of back plate, side plate, and the adjusting block which is represented as 25 in Fig. 9. This shell has within it a sliding plate 11 which plate has upon its face lugs 14 and 15 and projection 16. The lock is so constructed that projection 16 fits into hook 17 upon lock arm 6. The movement of lock arm 6, through hook 17 acting upon projection 16, moves locking plate 11; this moves lugs 14 and 15 in and out of the combination cogwheels 12 and 13. When the tumblers are in a position represented in the Fig. 3 the lock is in an open state, and the locking arm or the sliding plate can be easily moved back and forth. When, however, the lock arm is swung into closed position, the lugs 14 and 15 are moved into central positions in tumblers 12 and 13, so that by turning said tumblers by means of knobs 1 and 2 the notches in the tumblers are moved out of the normal paths of lugs 14 and 15, thus preventing movement of said lugs and disengagement of arm 6 from the bicycle wheel The lower portion of Fig. 6 illustrates four inside and six outside notches. These represent to a degree the opening in the tumblers which permits the passing in and out of the lugs 14 and 15. When the lock is open one trying to work out the combination of the lock will find himself deceived by the outside notches. He will often think he has the opening cut when as a matter of fact he has but one of these notches. The same principle applies when he is trying to discover the combination when the lock is closed. The movement of one of the lugs into one of these notches will give the impression that the opening of one of the tumblers is discovered when such is not the case.

In Fig. 7 5 is the top plate to which are pivoted the cog-dogs 18 and 19. These are held in place or in contact with the combination notches upon the tumblers by means of spring 20. The combination knobs 1 and 2 are pivoted in plate 5 and have squared inner ends engaging similar openings in cog-dogs 18 and 19.

The front plate 5 is attached to shell plate 7 by means of rivets passing through back plate 7. Screws, possessing round heads, with a square portion underneath being the length of the thickness of the covering plate, represented by 21 and 22 are placed in their proper position and the lock is now ready to be attached to the bicycle and the covering plate may then be placed in its proper position.

As before stated upon the back part of the shell plate 7 is the adjusting screw block 25. In this block are four adjusting screws 26 and four adjusting nuts 27. These are properly adjusted to fit tightly between forks of bicycle frame and hold the lock in place.

The covering plate 8 Fig. 8 contains a notch as shown in figure at the position of screw 21. This notch permits the plate to slide under the head of screw and upon the square portion of it. The covering plate has also a round opening to permit the plate to pass over head of screw 22. The plate is then moved down and the screw 22 passes into a notch in the plate. The plate is now attached by final screw 23. This screw can be removed when the lock is in open state but when the lock is locked, the covering hook 9 which is upon lock arm 6, covers screw 23, and makes its removal impossible.

The bicycle or other vehicles upon which the lock is used, when not in use, may be locked by means of this lock in the manner hereto before described. When the lock is opened, the lock arm is removed from the wheel, the tumblers are then thrown out of alinement. By this act the lock arm is prevented from returning and forming an impediment to the movement of the vehicle.

This makes the lock very convenient and useful.

What is claimed is as follows:

1. A lock comprising a casing; a securing plate detachably connected with the rear side of said casing and arranged to embrace and engage the sides of a bicycle fork; a swinging locking arm pivoted in said casing and provided with a hook arranged to engage the tire of a bicycle wheel between the spokes thereof; a hook on said locking arm arranged to engage over said securing plate to prevent its removal; and means in said casing for locking and releasing said arm, substantially as described.

2. A lock comprising a casing; a plug on the rear of said casing adapted to fit between the sides of the fork of a bicycle; adjusting screws on the sides of said plug and adapted to engage the inner sides of the fork; a securing plate detachably connected with the rear side of said casing and arranged to embrace and secure the sides of said fork; a swinging locking arm pivoted in said casing and arranged to be moved into and out of engagement with the bicycle wheel; a hook on said locking arm arranged to engage over said locking plate and prevent its removal; and a permutation lock arrangement in said casing arranged to lock and release said arm, substantially as described.

In testimony whereof I affix my signature in presence of two witnesses.

STEPHEN MOFFLER.

Witnesses:
GEORGE M. MESSER,
WENARD DILLEMUTH.